United States Patent
Kim et al.

(10) Patent No.: US 12,555,619 B2
(45) Date of Patent: Feb. 17, 2026

(54) PREAMBLE DETECTION CIRCUIT, OPERATION METHOD THEREOF, AND MEMORY DEVICE

(71) Applicant: Samsung Electronics Co., Ltd., Suwon-si (KR)

(72) Inventors: Wangsoo Kim, Suwon-si (KR); Minkyung Kim, Suwon-si (KR); Wonmuk Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 18/325,443

(22) Filed: May 30, 2023

(65) Prior Publication Data

US 2024/0096384 A1      Mar. 21, 2024

(30) Foreign Application Priority Data

Sep. 16, 2022  (KR) .................. 10-2022-0117245
Dec. 6, 2022   (KR) .................. 10-2022-0169113

(51) Int. Cl.
*G11C 7/20*     (2006.01)
*G11C 7/02*     (2006.01)
*G11C 7/14*     (2006.01)

(52) U.S. Cl.
CPC .................. *G11C 7/20* (2013.01); *G11C 7/02* (2013.01); *G11C 7/14* (2013.01)

(58) Field of Classification Search
CPC .... G11C 7/20; G11C 7/02; G11C 7/14; G11C 7/225; G11C 7/1093
USPC .......................................................... 365/191
See application file for complete search history.

(56) References Cited

U.S. PATENT DOCUMENTS

| | | | |
|---|---|---|---|
| 8,234,422 B2 | 7/2012 | Linam et al. | |
| 8,477,543 B2 | 7/2013 | Kwon | |
| 8,630,131 B1 * | 1/2014 | Shiao ............... | H03K 19/17724 365/233.13 |
| 2010/0257324 A1 | 10/2010 | Osawa et al. | |
| 2020/0302979 A1 * | 9/2020 | Kim ..................... | G11C 29/028 |

FOREIGN PATENT DOCUMENTS

| | | |
|---|---|---|
| JP | 5418412 B2 | 11/2013 |
| KR | 100816730 B1 | 3/2008 |
| KR | 101113331 B1 | 3/2012 |
| KR | 20140130872 A | 11/2014 |

* cited by examiner

*Primary Examiner* — Huan Hoang
(74) *Attorney, Agent, or Firm* — Wolf, Greenfield & Sacks, P.C.

(57) ABSTRACT

A preamble detection circuit, an operating method thereof, and a memory device are provided. The preamble detection circuit includes a comparison circuit configured to compare a level of a data strobe signal with a level of a reference voltage and to output a comparison signal, and a reset signal generation circuit configured to output a reset signal having a pulse width corresponding to a preamble period of the data strobe signal based on the comparison signal.

20 Claims, 10 Drawing Sheets

PREAMBLE DETECTION CIRCUIT, OPERATION METHOD THEREOF, AND MEMORY DEVICE

CROSS-REFERENCE TO RELATED APPLICATIONS

This application is based on and claims priority under 35 U.S.C. § 119 to Korean Patent Application Nos. 10-2022-0117245, filed on Sep. 16, 2022, and 10-2022-0169113, filed on Dec. 6, 2022 in the Korean Intellectual Property Office, the disclosures of which are incorporated by reference herein in their entirety.

BACKGROUND

The inventive concept relates to an electronic device, and more specifically, to a preamble detection circuit, an operating method thereof, and a memory device.

Semiconductor memories are widely used to store data in various electronic devices, such as computers, wireless communication devices, cameras, digital displays, and the like. Data is stored by programming various states of a semiconductor memory. To access the stored data, at least one stored state of the semiconductor memory may be read or sensed. To store data, components of a device may write or program the state of the semiconductor memory.

Various types of semiconductor memories exist. Volatile memory, such as dynamic random-access memory (DRAM), may lose its stored state when disconnected from external power. In addition, over time, the state of the semiconductor memory deteriorates, resulting in unrecoverable memory errors or other problems.

SUMMARY

The inventive concept, as manifested in one or more embodiments, provides a preamble detection circuit configured to prevent erroneous operation of reset and initialization of an interface, to reduce variations in delays of commands and data strobe signals, and to improve signal integrity (SI) and power integrity (PI) of a device, an operation method thereof, and a memory device.

According to an aspect of the inventive concept, there is provided a preamble detection circuit including a comparison circuit configured to compare a level of a data strobe signal with a level of a reference voltage and output a comparison signal, and a reset signal generation circuit configured to output a reset signal having a pulse width corresponding to a preamble period of the data strobe signal based at least in part on the comparison signal.

According to another aspect of the inventive concept, there is provided an operating method of a preamble detection circuit, the method including generating a comparison signal indicating a comparison result between a level of a data strobe signal and a level of a reference voltage, and generating a reset signal having a pulse width corresponding to a preamble period of the data strobe signal based at least in part on the comparison signal.

According to another aspect of the inventive concept, there is provided a memory device including a data strobe buffer configured to buffer a data strobe signal provided from the outside, and a preamble detection circuit configured to output a reset signal having a pulse width corresponding to a preamble period of the data strobe signal, based at least in part on the data strobe signal and a reference voltage.

BRIEF DESCRIPTION OF THE DRAWINGS

Embodiments will be more clearly understood from the following detailed description taken in conjunction with the accompanying drawings, wherein like reference numerals (when used) indicate corresponding elements throughout the several views, and in which.

DETAILED DESCRIPTION OF THE EMBODIMENTS

Hereinafter, embodiments of the inventive concept will be described in detail with reference to the accompanying drawings.

Figure 1:
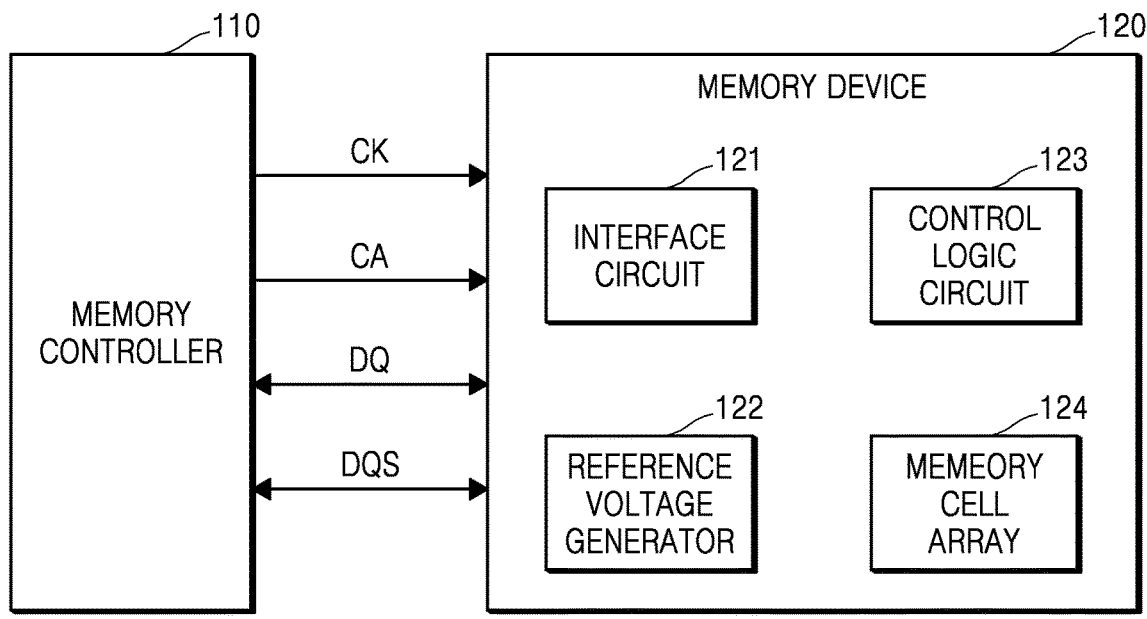
FIG. 1 is a diagram for explaining a memory system according to example embodiments of the inventive concept.

FIG. 1 is a block diagram for explaining at least a portion of a memory system 100 according to example embodiments of the inventive concept.

Referring to FIG. 1, the memory system 100 may refer to, but is not limited to, an integrated circuit, an electronic device or system, a smartphone, a tablet personal computer (PC), a computer, a server, a workstation, a portable communication terminal, a personal digital assistant (PDA), and a portable multimedia player (PMP), and a computing device, such as other suitable computers, a virtual machine or a virtual computing device thereof, and the like. Alternatively, the memory system 100 may be representative of one or more components included in a computing system, such as a graphics card. According to some embodiments, the memory system 100 may be implemented as unbuffered dual in-line memory modules (UDIMMs), registered DIMMs (RDIMMs), load reduced DIMMs (LRDIMMs), fully buffered DIMMs (FBDIMMs), small outline DIMMs (SODIMMs), and the like.

The memory system 100 may include a memory controller 110 and a memory device 120.

The memory controller 110 may be configured to initialize the memory device 120 and/or control the memory device 120 according to prescribed operating characteristics of the memory system 100. Various algorithms that configure the memory controller 110 may be included in the memory controller 110 so that the memory controller 110 may normally interact with the memory device 120. For example, code indicating frequency, timing, driving, and detailed operating parameters of the memory device 120 may be set. Memory training of the memory device 120 may be performed according to these pieces of code. Alternatively, such algorithms for configuring the memory controller 110, or portions thereof, may be provided to the memory controller, such as from an external component.

The memory controller 110 may be communicatively connected to the memory device 120 through a memory bus. A clock signal CK, a command/address signal CA, data DQ, and a data strobe signal DQS may be provided between the memory controller 110 and the memory device 120 through a corresponding signal line. Signal lines between the memory controller 110 and the memory device 120 may be connected through connectors. Connectors may be implemented as pins, balls, signal lines, or other hardware components.

The clock signal CK may be transmitted from the memory controller 110 to the memory device 120 through a clock signal line of a memory bus.

The command/address signal CA may be transmitted from the memory controller 110 to the memory device 120 through a command/address signal line of a memory bus.

The data DQ and the data strobe signal DQS may be transmitted from the memory controller 110 to the memory device 120 or from the memory device 120 to the memory controller 110 through the data bus and the data strobe signal line of the memory bus composed of bi-directional signal lines. A data strobe signal DQS may be used to sample data DQ.

Although not explicitly shown, a chip select signal may be provided between the memory controller 110 and the memory device 120. The chip select signal may be transmitted from the memory controller 110 to the memory device 120 through a chip select line of a memory bus (not explicitly shown, but implied). The chip select signal, when activated to a logic high level, may indicate that the command/address signal CA transmitted through the command/address signal line is a command. Alternatively, the chip select signal, when activated to a logic low level, may indicate that the command/address signal CA transmitted through the command/address signal line is an address. It is to be appreciated that the assignment of a logic high or logic low level as being indicative of a particular action associated with a given signal may be arbitrary.

The memory device 120 may write data DQ or read data under control by the memory controller 110.

The memory device 120 may include an interface circuit 121, a reference voltage generator 122, a control logic circuit 123, and a memory cell array 124.

The interface circuit 121, which may include a divider and an equalizer, may be configured to receive the data strobe signal DQS and data DQ from the memory controller 110. Alternatively, the interface circuit 121 may be configured to transmit the data strobe signal DQS and data DQ to the memory controller 110.

In some embodiments, the interface circuit 121 may be configured to output a reset signal for detecting a preamble period of the data strobe signal DQS based at least in part on the data strobe signal DQS and the reference voltage.

The reference voltage generator 122 may generate a reference voltage. The reference voltage generator 122 may provide the reference voltage to the interface circuit 121.

The memory cell array 124 may include a plurality of word lines, a plurality of bit lines, and a plurality of memory cells. The plurality of memory cells may be formed at points where word lines intersect with bit lines. Each memory cell may be a volatile memory cell (e.g., a Dynamic Random Access Memory (DRAM) cell, a Static RAM (SRAM) cell, etc.). However, the inventive concept is not limited thereto.

The control logic circuit 123 may be configured to receive the clock signal CK through the clock signal line of the memory bus and control the operation timing of the memory device 120. Operation timing of the memory device 120 may be provided based on a signal provided to the memory device 120, for example, a strobe signal, in addition to the clock signal CK, which may synchronize timing between the memory controller 110 and the memory device 120. The control logic circuit 123 may be configured to receive a command/address signal CA received through the command/address signal line and generate control signals to perform various memory operations in the memory device 120 in response to the command.

According to the above, there is an effect of reducing a variation of a delay of a command and a delay of a data strobe signal according to Power Supply Noise Induced Jitter (PSIJ)/Process, Voltage and Temperature (PVT) variations.

According to the above, by preventing the occurrence of tDQSS (e.g., "Write Command to first DQS transition time", that is, the delay time from the rising edge of the clock signal where the write command is input to the first rising edge of the data strobe signal), there is an effect of preventing malfunction of interface reset and initialization.

As described above, there is an effect of improving the reset variation of the divider and equalizer included in the interface circuit 121.

According to the above, there is an effect of enhancing the competitiveness of the device by enhancing the durability according to the variation of the PVT of the device.

As described above, there is an effect of improving signal integrity (SI) and power integrity (PI) of the device.

Figure 2:
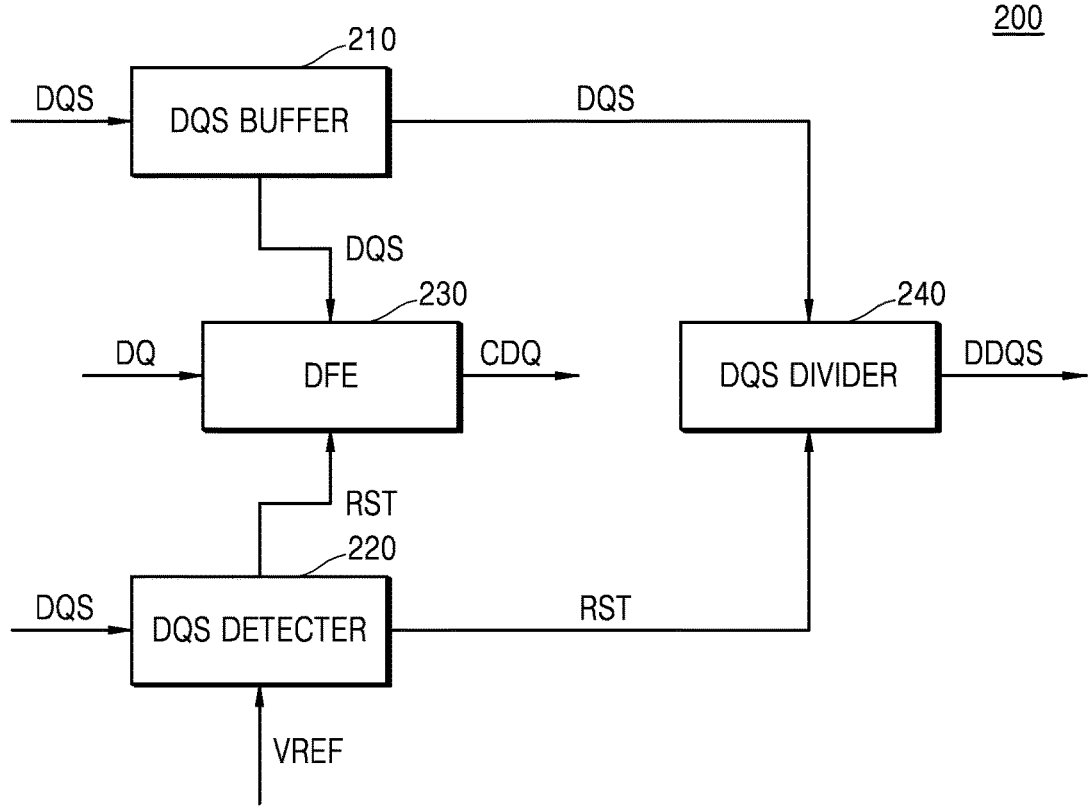
FIG. 2 is a block diagram for explaining at least a portion of an interface circuit according to example embodiments of the inventive concept.

FIG. 2 is a block diagram depicting at least a portion of an interface circuit 200 according to example embodiments of the inventive concept.

Referring to FIG. 2, the illustrative interface circuit 200 may be included in the interface circuit 121 shown in FIG. 1.

The interface circuit 200 may include a data strobe buffer 210, a data strobe detector 220, a decision feedback equalizer (DFE) 230, and a data strobe divider 240.

The data strobe buffer 210 may be configured to buffer the data strobe signal DQS provided from the outside. The data strobe buffer 210 may output the buffered data strobe signal DQS to the DFE 230 and the data strobe divider 240.

The data strobe detector 220 may be configured to output a reset signal RST based at least in part on the data strobe signal DQS and the reference voltage VREF supplied thereto. The reset signal RST may have a pulse width corresponding to the preamble period of the data strobe signal DQS. A signal level corresponding to the pulse width may be, for example, a logic high level. However, the inventive concept is not limited thereto. The reset signal RST may be provided to each of the DFE 230 and the data strobe divider 240.

Since the data strobe detector 220 may be configured to output a reset signal RST for detecting a preamble period, the data strobe detector 220 may be referred to as a preamble detection circuit.

The DFE 230, as a nonlinear equalizer, may cancel or reduce intersymbol interference (ISI) of the currently sampled data DQ by using previously sampled data DQ. As is known in the art, intersymbol interference is a form of signal distortion in which one data symbol interferes with subsequent data symbols in a data stream. The DFE 230 may be reset in response to a pulse of the reset signal RST. That is, the DFE 230 may be initialized in the preamble period of the data strobe signal DQS. After the preamble period, the DFE 230 may output restored data CDQ based on the data DQ and the data strobe signal DQS. That is, the DFE 230 may restore the distorted signal (e.g., as a result of ISI) to an original shape signal to thereby eliminate or reduce ISI in the sampled data DQ. The DFE 230 may be referred to as an equalizer.

The data strobe divider 240 may be reset in response to a pulse of the reset signal RST. That is, the data strobe divider 240 may be initialized in the preamble period of the data strobe signal DQS. After the preamble period, the data strobe divider 240 may divide the buffered data strobe signal DQS supplied thereto from the data strobe buffer 210. Also, the data strobe divider 240 may output a divided data strobe signal DDQS. The data strobe divider 240 may be referred to as a divider.

FIGS. 3 to 6 are block diagrams depicting at least a portion of a preamble detection circuit according to example embodiments of the inventive concept.

Referring to FIGS. 3 to 6, each of the illustrative preamble detection circuits 300, 400, 500, and 600 shown in FIGS. 3 to 6, respectively, may be included in the interface circuit 200 shown in FIG. 2. Each of the preamble detection circuits 300, 400, 500, and 600 illustrated in FIGS. 3 to 6 may correspond to the data strobe detector 220 illustrated in FIG. 2.

Figure 3:
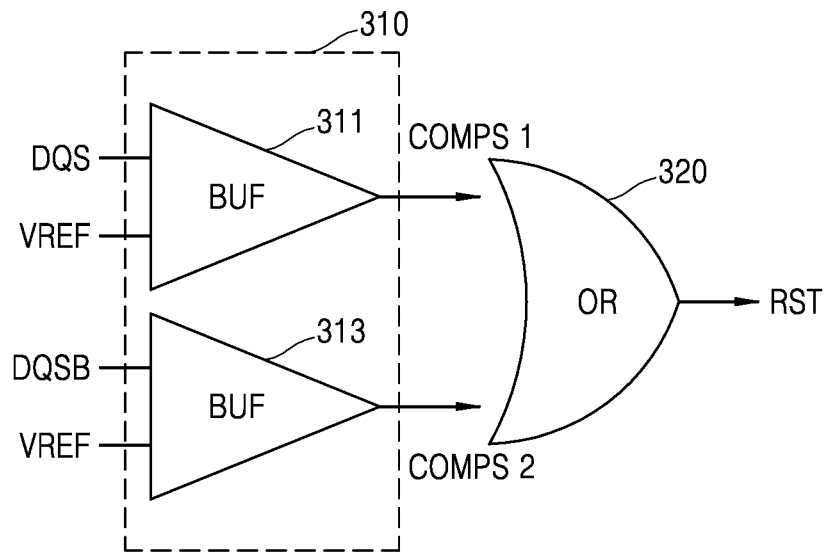
FIGS. 3 to 6 are block diagrams for explaining at least a portion of a preamble detection circuit according to example embodiments of the inventive concept.

Referring to FIG. 3, the preamble detection circuit 300 may include a comparison circuit 310 and a reset signal generation circuit 320.

The comparison circuit 310 may be configured to receive the reference voltage VREF and the data strobe signal DQS, and to compare the level of the data strobe signal DQS with the level of the reference voltage VREF and output one or more comparison signals (e.g., a first comparison signal COMPS 1 and/or a second comparison signal COMPS 2) indicative of a result of the comparison.

In some embodiments, the comparison circuit 310 may include a first comparator 311 and a second comparator 313.

The first comparator 311 may receive the data strobe signal DQS and the reference voltage VREF, and output a first comparison signal COMPS 1. The first comparison signal COMPS 1 may be a signal indicating a comparison result between the data strobe signal DQS and the reference voltage VREF. The first comparison signal COMPS 1 may be provided to the reset signal generation circuit 320.

When the level of the data strobe signal DQS is lower than the level of the reference voltage VREF, the first comparison signal COMPS 1 may have a first logic level (e.g., a logic high level). When the level of the data strobe signal DQS is higher than the level of the reference voltage VREF, the first comparison signal COMPS 1 may have a second logic level (e.g., a logic low level), wherein the second logic level is lower than the first logic level. However, the inventive concept is not limited thereto.

The second comparator 313 may receive an inverted (i.e., complement) data strobe signal DQSB and the reference voltage VREF, and output a second comparison signal COMPS 2. The inverted data strobe signal DQSB may be an inverted signal of the data strobe signal DQS. The second comparison signal COMPS 2 may be a signal indicating a comparison result between the inverted data strobe signal DQSB and the reference voltage VREF. The second comparison signal COMPS 2 may be provided to the reset signal generation circuit 320.

The level of the inverted data strobe signal DQSB may be higher than the level of the reference voltage VREF. In this case, the second comparison signal COMPS 2 may have a second logic level (e.g., a logic low level). Conversely, the level of the inverted data strobe signal DQSB may be lower than the level of the reference voltage VREF. In this case, the second comparison signal COMPS 2 may have a first logic level (e.g., a logic high level), wherein the second logic level is lower than the first logic level.

In some embodiments, the first comparator 311 and the second comparator 313 may be configured and implemented as a buffer ("BUF" shown in FIG. 3).

The reset signal generation circuit 320 may output a reset signal RST based on the comparison signal (e.g., a first comparison signal COMPS 1 and/or a second comparison signal COMPS 2) provided thereto. The reset signal RST may have a pulse width corresponding to the preamble period of the data strobe signal DQS.

In some embodiments, the reset signal generation circuit 320 may include an OR gate. The OR gate may calculate a logical operation result between the logic level of the first comparison signal COMPS 1 and the logic level of the second comparison signal COMPS 2 and output the operation result as the reset signal RST. Since the second comparison signal COMPS 2 may have a second logic level (e.g., a logic low level), an operation result output as the reset signal RST may correspond to the logic level of the first comparison signal COMPS 1. That is, the logic level of the reset signal RST may follow the logic level of the first comparison signal COMPS 1 when the second comparison signal COMPS 2 is at the second logic level.

Figure 4:
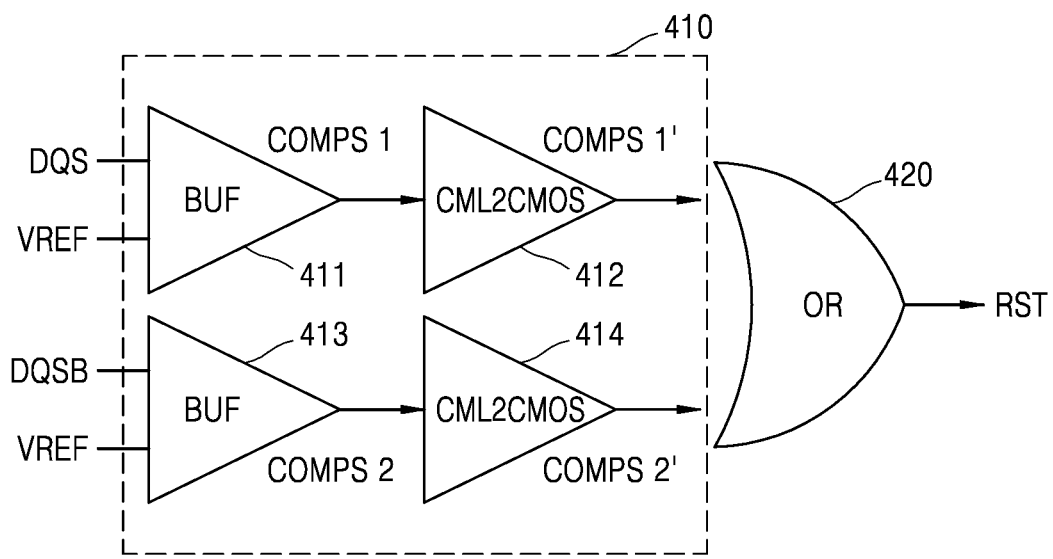

Referring to FIG. 4, the preamble detection circuit 400 may include a comparison circuit 410 and a reset signal generation circuit 420.

In some embodiments, the comparison circuit 410 may include a first comparator 411, a first amplifier 412, a second comparator 413, and a second amplifier 414.

The first comparator 411 may receive the data strobe signal DQS and the reference voltage VREF and output the first comparison signal COMPS 1 to the first amplifier 412. The first comparator 411 may be the same as the first comparator 311 shown in FIG. 3.

The first amplifier 412 may amplify the first comparison signal COMPS 1 output from the first comparator 411. Also, the first amplifier 412 may output the amplified first comparison signal COMPS 1'. The amplified first comparison signal COMPS 1' may be provided as an input to the reset signal generation circuit 420.

The second comparator 413 may receive the inverted data strobe signal DQSB and the reference voltage VREF and output the second comparison signal COMPS 2 to the second amplifier 414. The second comparator 413 may be the same as the second comparator 313 shown in FIG. 3.

The second amplifier 414 may amplify the second comparison signal COMPS 2 output from the second comparator 413. Also, the second amplifier 414 may output the amplified second comparison signal COMPS 2'. The amplified second comparison signal COMPS 2' may be provided as an input to the reset signal generation circuit 420.

In some embodiments, the first amplifier 412 and the second amplifier 414 may be implemented with transistors, for example, a current mode logic (CML) to complementary metal-oxide semiconductor (CMOS) (CML2CMOS) converter. However, the inventive concept is not limited thereto.

The reset signal generation circuit 420 may be similar to the reset signal generation circuit 320 shown in FIG. 3. In some embodiments, the reset signal generation circuit 420 may include an OR gate. The OR gate illustrated in FIG. 4 may calculate a logical operation result between the logic level of the amplified first comparison signal COMPS 1' and the logic level of the amplified second comparison signal COMPS 2'. Also, the reset signal generation circuit 420 may output an operation result as a reset signal RST.

Figure 5:
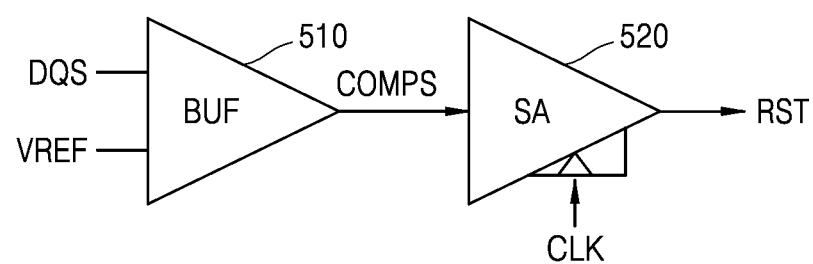

Referring to FIG. 5, the preamble detection circuit 500 may include a comparison circuit 510 and a reset signal generation circuit 520.

In some embodiments, the comparison circuit 510, as a comparator, may compare the level of the data strobe signal DQS with the level of the reference voltage VREF, and output the comparison signal COMPS to the reset signal generation circuit 520. For example, the comparison circuit 510 may include, for example, the first comparator 311 shown in FIG. 3.

When the level of the data strobe signal DQS is lower than the level of the reference voltage VREF, the comparison signal COMPS may have a first logic level, and when the level of the data strobe signal DQS is higher than the level of the reference voltage VREF, the comparison signal COMPS may have a second logic level, wherein the second logic level is lower than the first logic level.

In some embodiments, the reset signal generation circuit 520 may sample the logic level of the comparison signal COMPS in response to the clock signal CK input from the outside. In one or more embodiments, the reset signal generation circuit 520 may comprise a sampling circuit, referred to herein as a sampler (SA). The sampler SA may be configured to receive the comparison signal COMPS and to generate the reset signal RST as a version of the comparison signal COMPS that is aligned with the clock signal CK (e.g., rising edge, falling edge and/or level of the clock signal). The clock signal CK input from the outside may be the clock signal CK shown in FIG. 1. The reset signal generation circuit 520 may sample the logic level of the comparison signal COMPS at an edge (e.g., a rising edge and/or a falling edge) of the clock signal CK. The reset signal generation circuit 520 may output a sampling result as a reset signal RST. A sampling result output as the reset signal RST may correspond to a logic level of the comparison signal COMPS. That is, the logic level of the reset signal RST may follow the logic level of the comparison signal COMPS at a sampling interval based on the clock signal CK.

Figure 6:
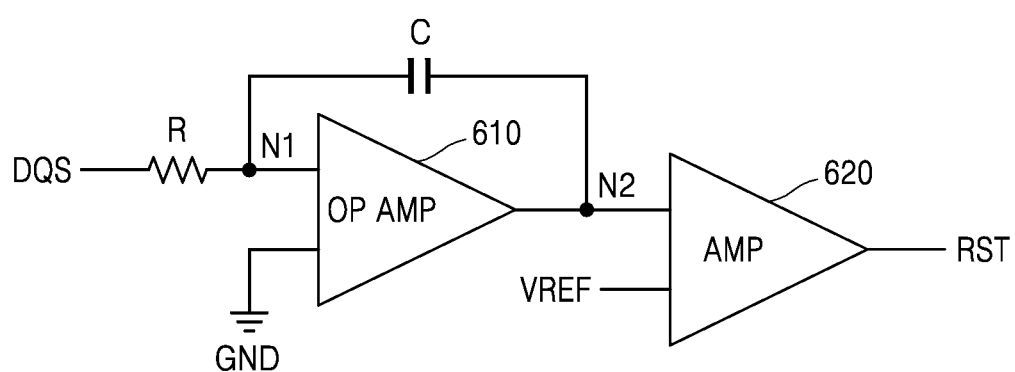

Referring to FIG. 6, the preamble detection circuit 600 may include a resistor R, a capacitor C, a first amplifier, which may be an operational amplifier 610, and a second amplifier 620.

The data strobe signal DQS may be provided to a first input of the operational amplifier 610 at a first node N1 through the resistor R connected in series between the first node N1 and the data strobe signal DQS.

A second input of the operational amplifier 610 may be connected to ground GND, and an output of the operational amplifier 610 may be connected to a second node N2 to which an output signal generated by the operational amplifier 610 is applied.

The capacitor C may be connected between the first node N1 and the second node N2 in a feedback configuration.

The reference voltage VREF may be applied to a first input of the second amplifier 620, and a second input of the second amplifier 620 may be connected to the second node N2. The second amplifier 620 may receive, as inputs, the signal generated by the operational amplifier 610 applied to the second node N2 and the reference voltage VREF, and generate, as an output, a reset signal RST as a function of the reference voltage VREF and the signal applied to the second node N2.

Figure 7:
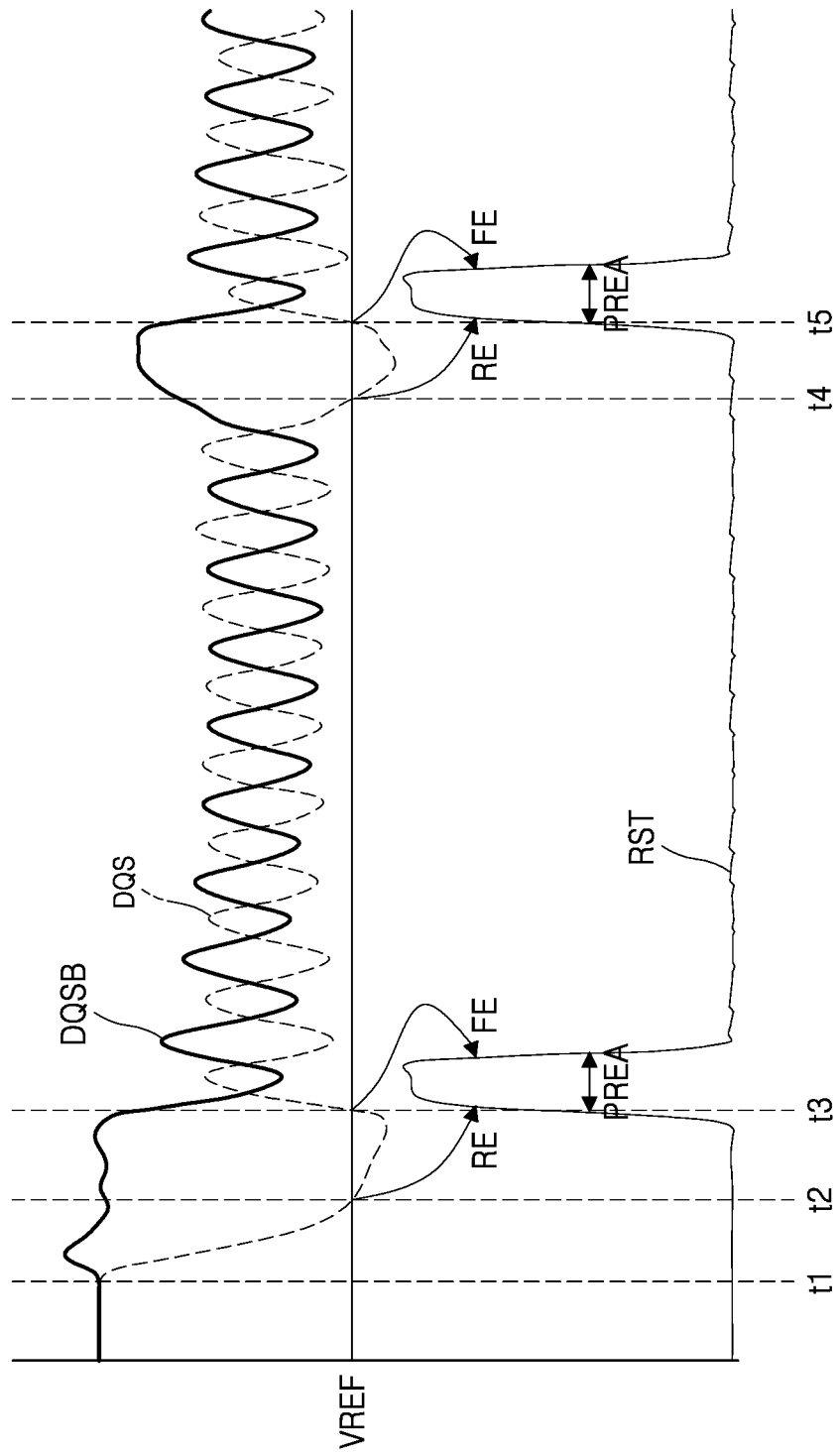
FIG. 7 is a graph illustrating a data strobe signal and an inverted data strobe signal for generating a reset signal according to example embodiments of the inventive concept.

FIG. 7 is a graph illustrating a data strobe signal and an inverted data strobe signal for generating a reset signal according to example embodiments of the inventive concept.

Referring to FIG. 7, after the first time t1, the level of the data strobe signal DQS (dotted waveform) may decrease. At this time, the inverted data strobe signal DQSB (solid waveform) may ripple. The level of the data strobe signal DQS may be higher than the level of the reference voltage VREF. In this case, the logic level of the reset signal RST may be a second logic level (e.g., a logic low level) that is lower than the first logic level (e.g., a logic high level).

At the second time t2, the level of the data strobe signal DQS may be lower than the level of the reference voltage VREF. In this case, the logic level of the comparison signal (e.g., COMPS shown in FIG. 5) may be a first logic level (e.g., a logic high level). Also, the reset signal RST may rise. That is, when the level of the data strobe signal DQS is lower than the level of the reference voltage VREF, a rising edge RE may occur in the reset signal RST, which may occur at some time after the second time t2 (e.g., delayed by a prescribed time, which may be a function of the clock CK in FIG. 5). The preamble period PREA of the data strobe signal DQS may start when the rising edge RE of the reset signal RST occurs.

At the second time t2, the level of the data strobe signal DQS may be lower than the level of the reference voltage VREF. From the second time t2 to the third time t3, since the level of the data strobe signal DQS is lower than the level of the reference voltage VREF, the logic level of the reset signal RST may maintain the second logic level.

At the third time t3, the level of the data strobe signal DQS may be higher than the level of the reference voltage VREF. At this time, the logic level of the comparison signal (e.g., COMPS shown in FIG. 5) may be the second logic level. Also, the reset signal RST may fall. That is, when the level of the data strobe signal DQS is higher than the level of the reference voltage VREF, the falling edge FE of the reset signal RST may occur at some time after the third time t3 (e.g., delayed by a prescribed time). From when the falling edge FE of the reset signal RST occurs, the preamble period PREA of the data strobe signal DQS may end.

The preamble period PREA of the data strobe signal DQS may be a period from when the rising edge RE of the reset signal RST occurs to when the falling edge FE of the reset signal RST occurs.

Referring to FIGS. 2 and 7, when the rising edge RE of the reset signal RST occurs, the DFE 230 and the data strobe divider 240 may be reset or initialized. During the preamble period PREA of the data strobe signal DQS, the DFE 230 and the data strobe divider 240 may have preset initial values. When the falling edge FE of the reset signal RST occurs, the DFE 230 and the data strobe divider 240 may perform normal operations.

After the third time t3, the data strobe signal DQS and the inverted data strobe signal DQSB may be toggled.

At the fourth time t4, after the third time t3, the level of the data strobe signal DQS may again decrease to a level lower than that of the reference voltage VREF. At this time, a rising edge RE may occur in the reset signal RST.

At the fifth time t5, after the fourth time t4, the level of the data strobe signal DQS may increase and then become higher than the level of the reference voltage VREF. At this time, a falling edge FE may occur in the reset signal RST. As previously explained, the preamble period PREA of the data strobe signal DQS may be a period from when the rising edge RE of the reset signal RST occurs (after the fourth time t4) to when the falling edge FE of the reset signal RST occurs (after the fifth time t5).

After the fifth time t5, the data strobe signal DQS and the inverted data strobe signal DQSB may be toggled.

Figure 8:
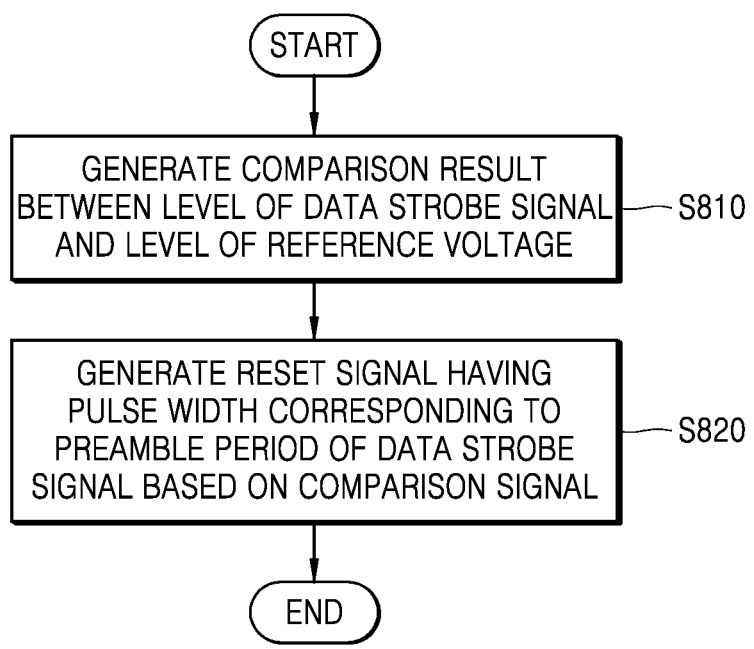
FIG. 8 is a flowchart illustrating at least a portion of an operating method of a preamble detection circuit according to example embodiments of the inventive concept.

FIG. 8 is a flowchart illustrating an example operating method of a preamble detection circuit according to example embodiments of the inventive concept.

Referring to FIG. 8, in S810, a comparison signal indicating a comparison result between the level of the data strobe signal and the level of the reference voltage is generated.

The embodiment for S810 may be implemented in a manner consistent with the illustrative embodiment of the comparison circuits 310, 410, and 510 shown in FIGS. 3 to 5 or some embodiments of the operational amplifier 610 and the second amplifier 620 shown in FIG. 6.

In S820, a reset signal having a pulse width corresponding to the preamble period of the data strobe signal is generated based on the comparison signal.

The embodiment for S820 may be implemented in a manner consistent with the embodiment of the reset signal generation circuits 320, 420, 520 shown in FIGS. 3 to 5 or some embodiments of the second amplifier 620 shown in FIG. 6 described above.

In some embodiments, when the level of the data strobe signal becomes less than the level of the reference voltage, the reset signal may rise. Alternatively, when the level of the data strobe signal is higher than the level of the reference voltage, the reset signal may fall.

In some embodiments, the reset signal may be input to at least one of a divider (e.g., the data strobe divider 240 shown in FIG. 2) and an equalizer (e.g., the DFE 230 shown in FIG. 2). The divider and equalizer may each be initialized in the preamble period of the data strobe signal.

Figure 9:
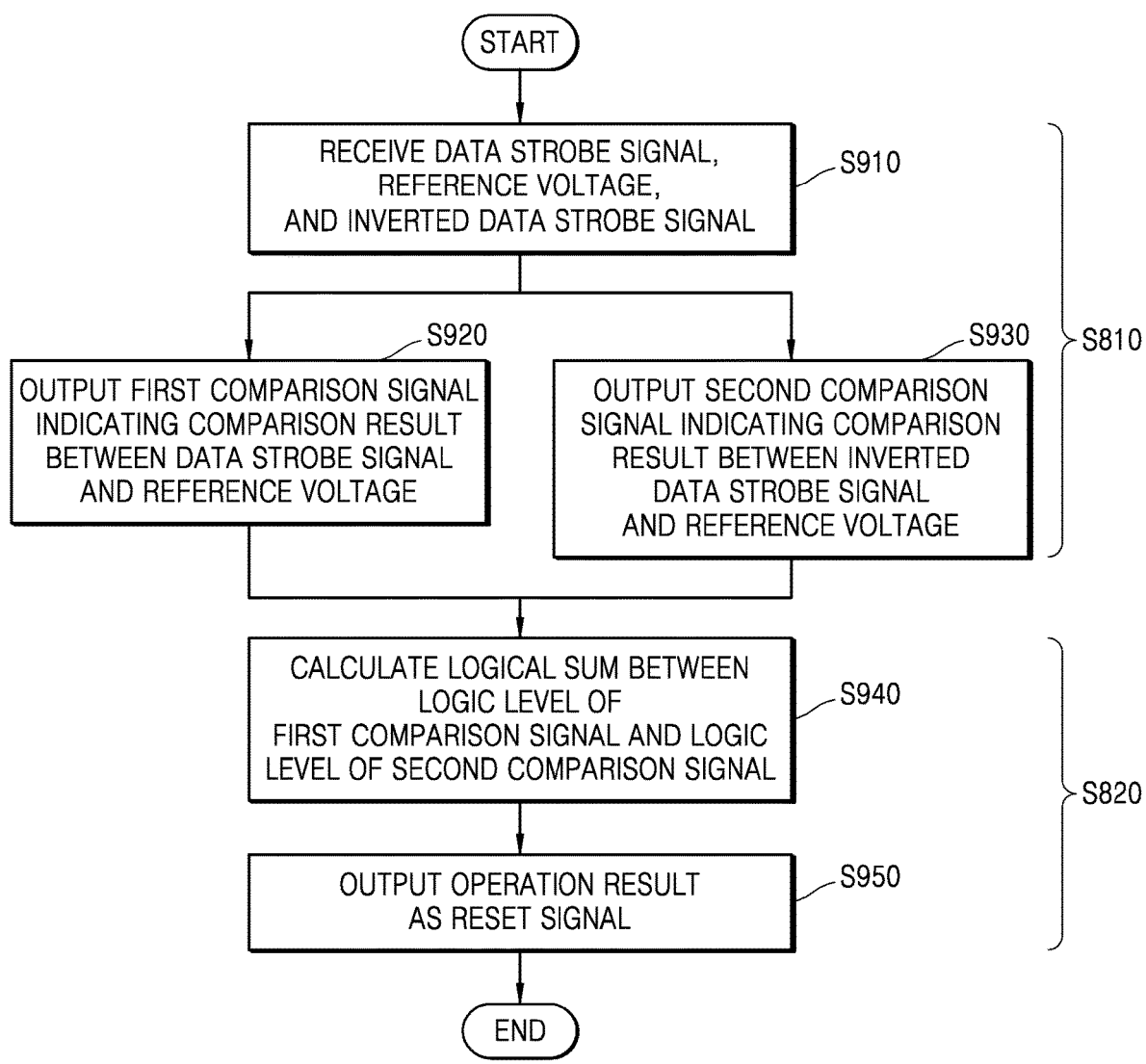
FIG. 9 is a flowchart illustrating at least a portion of an operating method of the example preamble detection circuit shown in FIG. 3.

FIG. 9 is a flowchart illustrating an example operating method of the preamble detection circuit shown in FIG. 3.

Referring to FIGS. 3, 8, and 9, in some embodiments, S810 may include S910, S920, and S930, and S820 may include S940 and S950.

In S910, a data strobe signal, a reference voltage, and an inverted data strobe signal may be received. Referring to FIG. 3, for example, the first comparator 311 may receive the data strobe signal DQS and the reference voltage VREF. Also, the second comparator 313 may receive the inverted data strobe signal DQSB and the reference voltage VREF.

In S920, outputting a first comparison signal indicating a comparison result between the data strobe signal (DQS) and the reference voltage (VREF) is performed. Referring to FIG. 3, for example, the first comparator 311 may output the first comparison signal COMPS 1.

In S930, outputting a second comparison signal indicating a comparison result between the inverted data strobe signal (DQSB) and the reference voltage (VREF) is performed. Referring to FIG. 3, for example, the second comparator 313 may output the second comparison signal COMPS 2.

In S940, a logical operation result between the logic level of the first comparison signal and the logic level of the second comparison signal is calculated. Referring to FIG. 3, for example, the reset signal generation circuit 320, which may be implemented as an OR gate, may calculate a logical operation result between the logic level of the first comparison signal COMPS 1 and the logic level of the second comparison signal COMPS 2.

In S950, outputting a logical operation result as a reset signal is performed. Referring to FIG. 3, for example, if any one of the logic level of the first comparison signal COMPS 1 and the logic level of the second comparison signal COMPS 2 is a logic high level, the OR operation result is a logic high level. Alternatively, when both the logic level of the first comparison signal COMPS 1 and the logic level of the second comparison signal COMPS 2 are at the logic low level, the OR operation result is the logic low level. The reset signal RST may have a logic high level or a logic low level according to a logical operation result.

Figure 10:
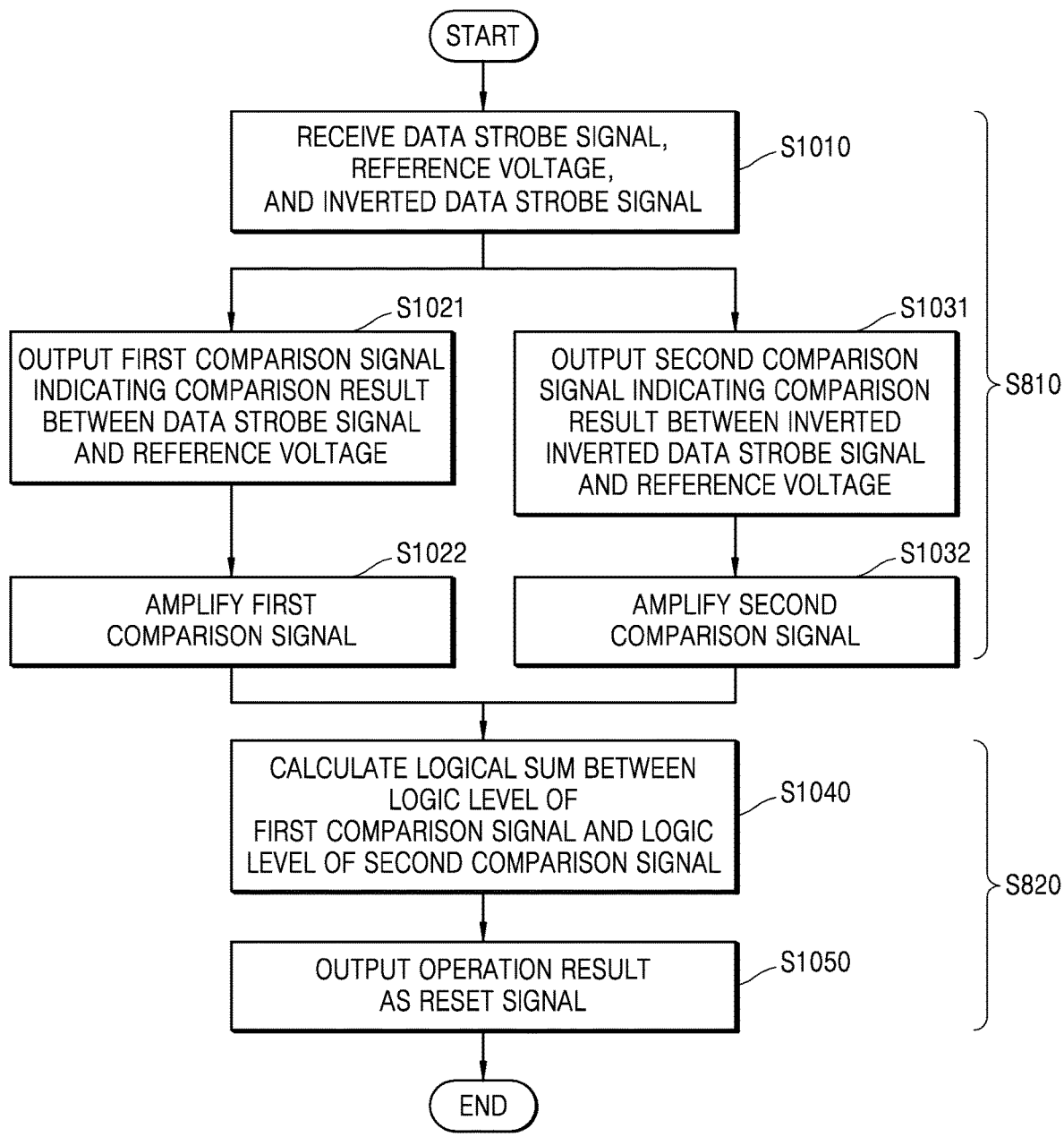
FIG. 10 is a flowchart for explaining at least a portion of an illustrative operating method of the example preamble detection circuit shown in FIG. 4.

FIG. 10 is a flowchart illustrating an example operating method of the preamble detection circuit 400 shown in FIG. 4.

Referring to FIGS. 4, 8, and 10, in some embodiments, S810 may include S1010, S1021, S1022, S1031, and S1032, and S820 may include S1040 and S1050.

S1010 may be the same as S910 previously described in conjunction with FIG. 9. S1021 may be the same as S920 previously described in conjunction with FIG. 9.

In S1022, amplifying the first comparison signal is performed. Referring to FIG. 4, for example, the first amplifier 412 may amplify the first comparison signal COMPS 1 output from the first comparator 411 and output the amplified first comparison signal COMPS 1'.

S1031 may be the same as S930 previously described in conjunction with FIG. 9.

In S1032, amplifying the second comparison signal is performed. Referring to FIG. 4, for example, the second amplifier 414 may amplify the second comparison signal COMPS 2 output from the second comparator 413 and output the amplified second comparison signal COMPS 2'.

In S1040, a logical operation result between the logic level of the amplified first comparison signal and the logic level of the amplified second comparison signal is calculated. Referring to FIG. 4, for example, the reset signal generation circuit 420, which may be implemented as an OR gate, may calculate a logical operation result between the logic level of the amplified first comparison signal COMPS 1' and the logic level of the amplified second comparison signal COMPS 2'.

In S1050, outputting a logical operation result as a reset signal is performed. Referring to FIG. 4, for example, the reset signal generation circuit 420 may output a logical operation result as a reset signal RST.

Figure 11:
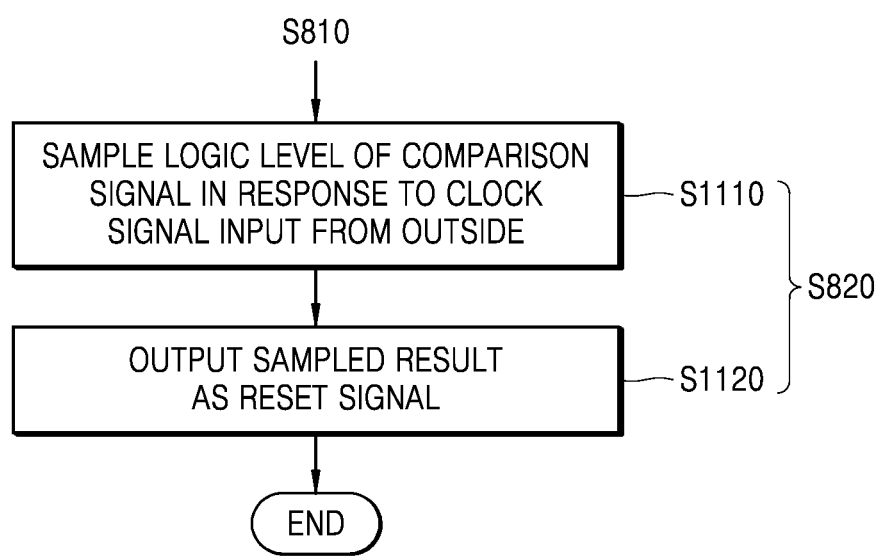
FIG. 11 is a flowchart for explaining at least a portion of an example operating method of the illustrative preamble detection circuit shown in FIG. 5.

FIG. 11 is a flowchart illustrating an example operating method of the preamble detection circuit 500 shown in FIG. 5.

Referring to FIGS. 5, 8, and 11, the operating method of the preamble detection circuit 500 shown in FIG. 5 may include S810 and S820 of FIG. 8.

In some embodiments, S820 may include S1110 and S1120.

In S1110, sampling the logic level of the comparison signal in response to a clock signal input from the outside is performed. Referring to FIG. 5, for example, the reset signal generation circuit 520 may sample the logic level of the comparison signal COMPS at an edge (e.g., a rising edge) of the clock signal CK.

In S1120, outputting a sampled result as a reset signal is performed. Referring to FIG. 5, for example, the reset signal generation circuit 520 may output a sampled result as a reset signal RST. The logic level of the reset signal RST may follow the logic level of the comparison signal COMPS.

Figure 12:
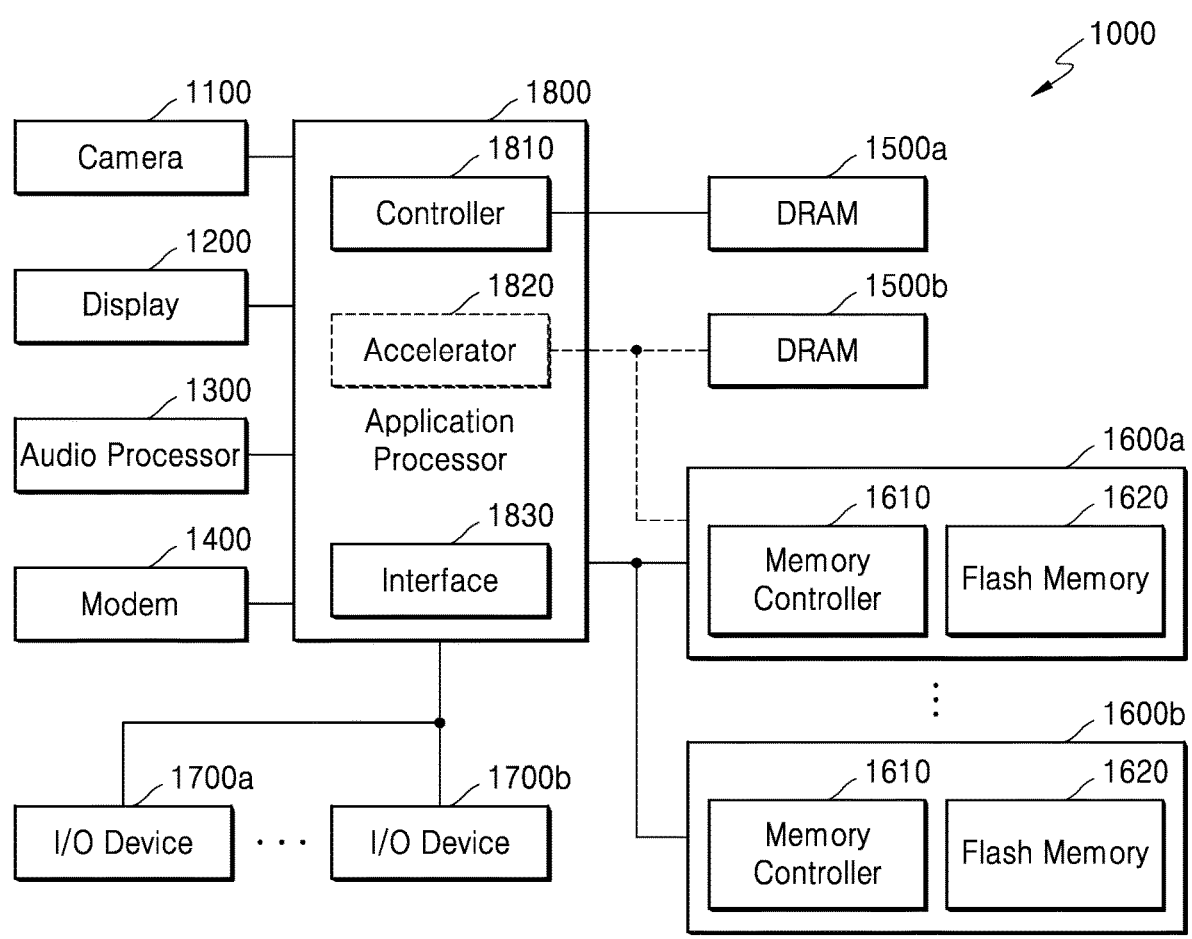
FIG. 12 is a block diagram illustrating at least a portion of an electronic system according to example embodiments of the inventive concept.

FIG. 12 is a block diagram illustrating at least a portion of an electronic system according to example embodiments of the inventive concept.

Referring to FIG. 12, an electronic system 1000 may be implemented as, but not limited to, a laptop computer, a mobile phone, a smartphone, a tablet personal computer, a wearable device, a healthcare device, or an Internet of Things (IoT) device. In addition, the electronic system 1000 may be implemented as a server or a personal computer.

The electronic system 1000 may include a camera 1100, a display 1200, an audio processor 1300, a modem 1400, volatile memories (e.g., DRAM) 1500a and 1500b, flash memories 1600a and 1600b, input/output (I/O) devices 1700a and 1700b, and an application processor (AP) 1800 (hereinafter referred to as "AP").

The camera 1100 may capture a still image or a moving image according to a user's control.

The audio processor 1300 may process audio data included in content stored in one or more of the flash memory devices 1600a and 1600b or provided from a network.

The modem 1400 may be configured to modulate and transmit a signal to transmit/receive wired/wireless data, and may demodulate the modulated signal to restore the original signal at the receiving end.

The I/O devices 1700a and 1700b may include devices that provide digital input and/or output functionality.

The AP 1800 may control all or some operations of the electronic system 1000. The AP 1800 may control the display 1200 to display a portion of content. When a user input is received through the I/O devices 1700a and 1700b, the AP 1800 may perform a control operation corresponding to the user input. The AP 1800 may optionally include an accelerator 1820, which is a dedicated circuit for Artificial Intelligence (AI) data calculation. The volatile memory 1500b may additionally reside in the accelerator 1820. The accelerator 1820 may be a functional block that performs a certain function of the AP 1800. The accelerator 1820 may include a graphics processing unit (GPU), a neural processing unit (NPU), and a data processing unit (DPU). The GPU may be a block that specializes in processing graphics data. The NPU may be a block for professionally performing AI calculations and inference. The DPU may be a block specializing in data transmission.

The AP 1800 may control the volatile memories 1500a and 1500b through commands and mode register settings (e.g., MRS) conforming to the JEDEC (Joint Electron Device Engineering Council) standard. Alternatively, the AP 1800 may set a DRAM interface protocol to use a company-specific function, such as low voltage/high speed/reliability and a Cyclic Redundancy Check (CRC)/Error Correction Code (ECC) function.

A controller 1810 included in the AP 1800 may correspond to the memory controller 110 described above with reference to FIG. 1.

The volatile memories 1500a and 1500b, which may comprise DRAM, may have relatively smaller latency and bandwidth than the I/O devices 1700a and 1700b or the flash memories 1600a and 1600b. The volatile memories 1500a and 1500b may be initialized at the power-on time point of the electronic system 1000, and may be used as a temporary storage location for the operating system and application data loaded with the operating system and application data, or may be used as an execution space for various software code.

In the volatile memories 1500a and 1500b, addition/subtraction/multiplication/division operations, vector operations, address operations, or Fast Fourier Transform (FFT) operations may be performed. In addition, a function used for inference may be performed by the volatile memories 1500a and 1500b.

Each of the volatile memories 1500a and 1500b may correspond to the memory device 120 described above with reference to FIG. 1.

The flash memories 1600a and 1600b may store pictures taken through the camera 1100 or data transmitted through a data network. Each of the flash memories 1600a, 1600b may include a memory controller 1610 and a flash memory array 1620; one or more operations of the flash memory array 1620 may be controlled by the memory controller 1610. The flash memories 1600a and 1600b may have a larger capacity than the volatile memories 1500a and 1500b.

Figure 13:
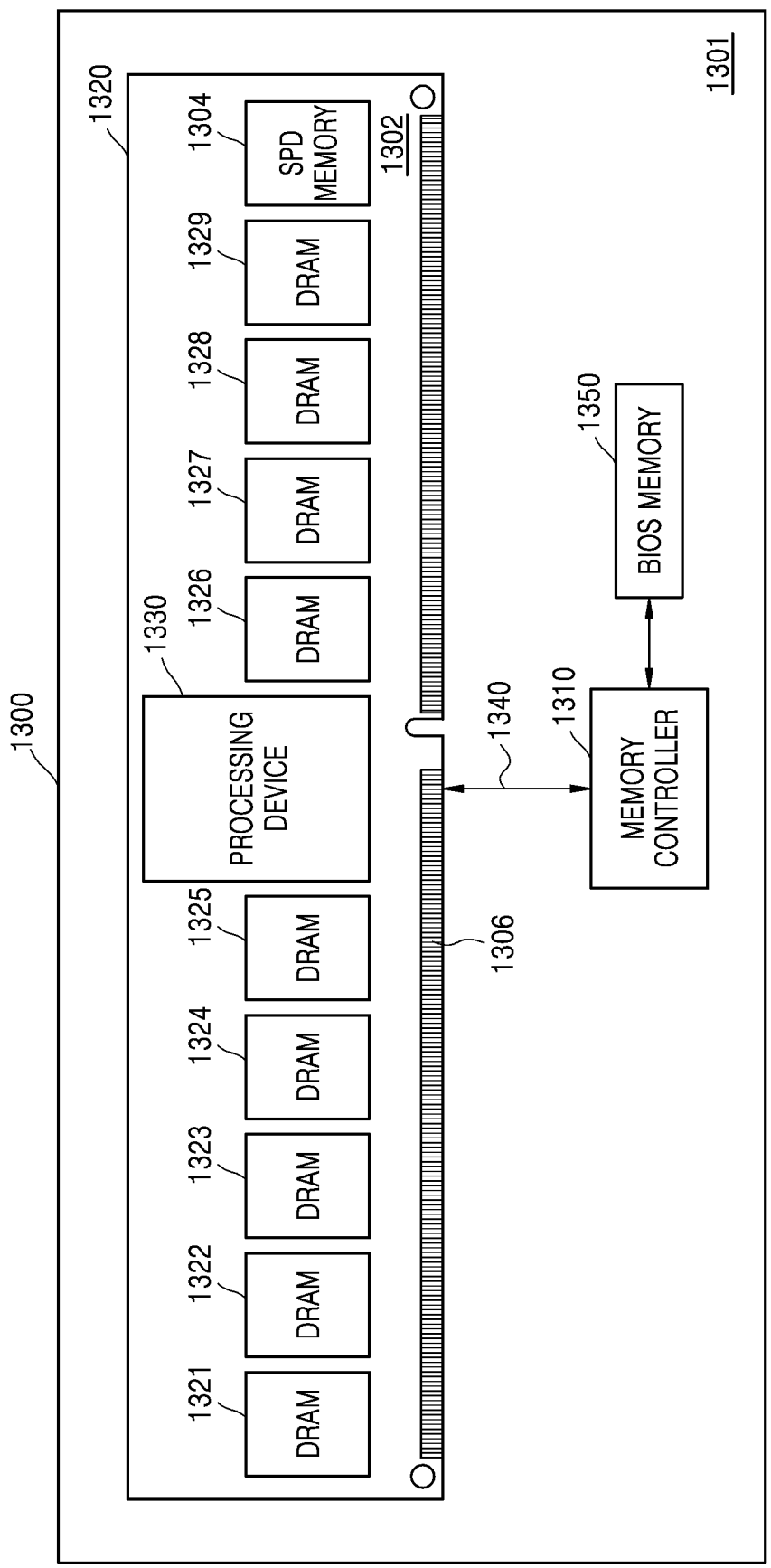
FIG. 13 is a diagram for describing at least a portion of a computing system according to example embodiments of the inventive concept.

FIG. 13 is a diagram for describing at least a portion of a computing system 1300 according to example embodiments of the inventive concept.

Referring to FIG. 13, the computing system 1300 may include a host 1310, a memory module 1320, and a Basic Input/Output System (BIOS) memory 1350, mounted on a board 1301. The host 1310 may be referred to as a memory controller shown in FIG. 13.

The host 1310 may include the memory controller 110 shown in FIG. 1.

The host 1310 may be communicatively connected to the memory module 1320 through a memory bus 1340 or other connection means.

The host 1310 may operate as a functional block that performs general computer operations within the computing system 1300. The host 1310 may, for example, correspond to a central processing unit (CPU), a digital signal processor (DSP), or an AP.

The host 1310 may be configured to execute one or more machine-executable instructions or pieces of software, firmware, or a combination thereof. The host 1310 may be connected to the BIOS memory 1350 through various interfaces, such as, but not limited to, a serial peripheral interface or a low pin count bus.

The BIOS memory 1350 may store BIOS code for booting the computing system 1300. The BIOS memory 1350 may be implemented as a nonvolatile memory device, such as a flash memory. The BIOS code may include power-on self-test (POST) code and/or part of the POST code for detecting the hardware of the computing system 1300, such as the board 1301, the memory module 1320, a keyboard, and a disk drive, and verifying whether the hardware operates normally. The BIOS code may include memory reference code (MRC) for initialization of the memory module 1320. The MRC may include various algorithms configured to enable the host 1310 to normally interoperate with the memory module 1320.

By the MRC executed by the host 1310, the SPD data stored in a Serial Presence Detect (SPD) memory device 1304 of the memory module 1320 may be read through the memory bus 1340, and frequency, timing, drive, and detailed operation parameters for controlling the memory module 1320 may be set using the SPD data. The SPD data may include, for example, the type of the memory module 1320, the type of memory device included in the memory module 1320, operation timing information, manufacturing information, revision code, a serial number, and the like. Built-in self-test (BIST) and/or memory training of the memory module 1320 may be performed by the MRC code.

The memory module 1320 may be configured to perform a processing function and may include a processing device 1330, a plurality of memory devices 1321 to 1329, and the SPD memory device 1304, disposed on a printed circuit board 1302. For example, the memory module 1320 may be implemented as RDIMM, LRDIMM, FBDIMM, SODIMM, and the like.

The processing device 1330 may include a Registered Clock Driver (RCD).

The memory devices 1321 to 1329 may be configured to store data written thereto and/or read therefrom. For example, the memory devices 1321 to 1329 may be DRAM devices. However, the scope of the inventive concept is not limited thereto, and the memory devices 1321 to 1329 may be any one of volatile memory devices, such as Synchronous DRAM (SDRAM), Double Data Rate SDRAM (DDR SDRAM), Low Power Double Data Rate SDRAM (LPDDR SDRAM), Graphics Double Data Rate SDRAM (GDDR SDRAM), DDR2 SDRAM, DDR3 SDRAM, DDR4 SDRAM, DDR5 SDRAM, and the like.

Each of the memory devices 1321 to 1329 may correspond to the memory device 120 described above with reference to FIG. 1.

The memory bus 1340 may be implemented as one channel or a plurality of channels including a plurality of signal lines between the host 1310 and connecting pins 1306 of the memory module 1320. The memory bus 1340 may include command/address signal lines for transmitting commands/addresses and data lines for transmitting data.

While the inventive concept has been particularly shown and described with reference to embodiments thereof, it will be understood that various changes in form and details may be made therein without departing from the spirit and scope of the following claims.

What is claimed is:

1. A preamble detection circuit, comprising:
    a comparison circuit configured to compare a level of a data strobe signal with a level of a reference voltage and to output a comparison signal; and
    a reset signal generation circuit configured to output a reset signal having a pulse width corresponding to a preamble period of the data strobe signal based on the comparison signal.

2. The preamble detection circuit of claim 1, wherein the comparison circuit comprises:
    a first comparator configured to receive the data strobe signal and the reference voltage and to output a first comparison signal indicating a comparison result between the data strobe signal and the reference voltage; and
    a second comparator configured to receive an inverted data strobe signal, obtained by inverting the data strobe signal, and the reference voltage, and to output a second comparison signal indicating a comparison result between the inverted data strobe signal and the reference voltage,
    wherein the reset signal generation circuit comprises an OR gate configured to generate an operation result as the reset signal, the operation result being a function of a logical OR between a logic level of the first comparison signal and a logic level of the second comparison signal.

3. The preamble detection circuit of claim 2, wherein the first comparison signal has a first logic level when the level of the data strobe signal is lower than the level of the reference voltage, and has a second logic level that is lower than the first logic level when the level of the data strobe signal is higher than the level of the reference voltage,
    wherein the reset signal corresponds to the logic level of the first comparison signal.

4. The preamble detection circuit of claim 2, wherein the comparison circuit further comprises:
    a first amplifier configured to amplify the first comparison signal output from the first comparator and to provide the amplified first comparison signal to the OR gate; and
    a second amplifier configured to amplify the second comparison signal output from the second comparator and to provide the amplified second comparison signal to the OR gate.

5. The preamble detection circuit of claim 2, wherein each of the first comparator and the second comparator comprises at least one buffer.

6. The preamble detection circuit of claim 1, wherein the reset signal generation circuit comprises a sampler configured to sample a logic level of the comparison signal in response to a clock signal provided to the sampler, and to output a sampling result as the reset signal.

7. The preamble detection circuit of claim 6, wherein the comparison signal has a first logic level when the level of the data strobe signal is lower than the level of the reference voltage, and has a second logic level that is lower than the first logic level when the level of the data strobe signal is higher than the level of the reference voltage,
    wherein the sampling result output as the reset signal corresponds to the logic level of the comparison signal.

8. The preamble detection circuit of claim 1, wherein the reset signal rises when the level of the data strobe signal is lower than the level of the reference voltage, and falls when the level of the data strobe signal is higher than the level of the reference voltage.

9. The preamble detection circuit of claim 1, wherein the reset signal is provided as an input to at least one of a divider and an equalizer each initialized in the preamble period.

10. An operating method of a preamble detection circuit, the method comprising:
    generating a comparison signal indicative of a comparison result between a level of a data strobe signal and a level of a reference voltage; and
    generating a reset signal having a pulse width corresponding to a preamble period of the data strobe signal based on the comparison signal.

11. The operating method of claim 10, wherein generating the comparison signal comprises:
    receiving the data strobe signal, the reference voltage, and an inverted data strobe signal;
    generating a first comparison signal indicative of a comparison result between the data strobe signal and the reference voltage; and
    generating a second comparison signal indicative of a comparison result between the inverted data strobe signal and the reference voltage,
    wherein generating the reset signal comprises:
    generating an operation result as a function of a logical operation between a logic level of the first comparison signal and a logic level of the second comparison signal; and
    outputting the operation result as the reset signal.

12. The operating method of claim 11, wherein generating the comparison signal further comprises:
    amplifying the first comparison signal; and
    amplifying the second comparison signal.

13. The operating method of claim 10, wherein generating the reset signal comprises:
    sampling a logic level of the comparison signal in response to an external clock signal to generate a sampling result; and
    outputting the sampling result as the reset signal.

14. The operating method of claim 10, wherein the reset signal rises when the level of the data strobe signal is lower than the level of the reference voltage, and falls when the level of the data strobe signal is higher than the level of the reference voltage.

15. The operating method of claim 10, further comprising providing the reset signal as an input to at least one of a divider and an equalizer each initialized in the preamble period.

16. A memory device, comprising:
    a data strobe buffer configured to buffer a data strobe signal provided to the data strobe buffer to generate a buffered data strobe signal; and
    a preamble detection circuit configured to output a reset signal having a pulse width corresponding to a preamble period of the data strobe signal, based on the data strobe signal and a reference voltage.

17. The memory device of claim 16, wherein the preamble detection circuit comprises:
    an operational amplifier having a first input connected to ground, a second input adapted to receive the data strobe signal, and an output; and
    an amplifier having a first input adapted to receive the reference voltage, a second input connected to the output of the operational amplifier, and an output configured to generate the reset signal.

18. The memory device of claim 16, wherein the reset signal rises when a level of the data strobe signal is lower than a level of the reference voltage, and falls when the level of the data strobe signal is higher than the level of the reference voltage.

19. The memory device of claim 16, further comprising a divider configured to be initialized in response to the reset signal in the preamble period and to divide the buffered data strobe signal after the preamble period.

20. The memory device of claim 16, further comprising an equalizer configured to be initialized in response to the reset signal in the preamble period and to restore a distorted data signal supplied to the equalizer to an original shape signal of the distorted data signal after the preamble period.

* * * * *